United States Patent [19]

Washbourn et al.

[11] Patent Number: 4,895,228

[45] Date of Patent: Jan. 23, 1990

[54] SLACK ADJUSTER

[75] Inventors: Jack Washbourn, Axminster; Keith W. Langley, Bath, both of England

[73] Assignee: Westinghouse Brake & Signal Holdings Limited, Chippenham, England

[21] Appl. No.: 299,386

[22] Filed: Jan. 23, 1989

[30] Foreign Application Priority Data

Jan. 27, 1988 [GB] United Kingdom ............... 8801793
Jun. 28, 1988 [GB] United Kingdom ............... 8815373

[51] Int. Cl.$^4$ ............................................. F16D 65/56
[52] U.S. Cl. .............................. 188/202; 188/196 D; 188/198; 188/203
[58] Field of Search ................................ 188/198–203, 188/196 D, 196 V, 196 P, 196 B, 79.51, 79.56, 74–76, 153, 170

[56] References Cited

U.S. PATENT DOCUMENTS

| | | | |
|---|---|---|---|
| 2,062,497 | 12/1936 | Browall | 188/202 |
| 3,557,915 | 1/1971 | Pollinger | 188/203 |
| 3,589,477 | 6/1971 | Sander | 188/196 D |
| 3,707,208 | 12/1972 | Kyllonen | 188/202 |
| 4,441,591 | 4/1986 | Severinsson et al. | 188/196 D X |
| 4,662,485 | 5/1987 | Kanjo et al. | 188/196 D |
| 4,676,346 | 6/1987 | Barberis | 188/196 D X |

Primary Examiner—Douglas C. Butler
Attorney, Agent, or Firm—Nilsson, Robbins, Dalgarn, Berliner, Carson & Wurst

[57] ABSTRACT

A slack adjuster has a non-rotatable fast-threaded output member (19) threadedly engaged by a pair of nuts (20, 21), one of the nuts being a first brake-force-transmitting nut (20) clutchable to prevent rotation thereof and the other being a second adjustment nut (21) clutchable to land. Relative axial movement of these nuts relative to the output member (19) is a measure of "excessive" brake clearance and restoration of the normal spacing between these nuts serves to restore brake clearance to "normal". The nuts (20, 21) are housed in a housing (8) which is non-rotatable but axially movable with respect to the output member (19). The first nut (20) is clutchable to a thrust member (26) resiliently loaded with a force which is overcome only by forces of the magnitude of braking forces transmitted through the slack adjuster. There is a releasable coupling (30/31) between the housing (8) and the second nut (21) which includes a splined connection (31) and which is inoperative to prevent the second nut (21) spinning on the output member (19) except when the force transmitted by the slack adjuster is sufficient to overcome the resilient loading of the thrust member (26).

7 Claims, 3 Drawing Sheets

SLACK ADJUSTER

BACKGROUND OF THE INVENTION

1. Field of the Invention:
This invention relates to slack adjusters.
2. Description of the Prior Art Slack adjusters are well known and, in one form, have a non-rotatable fast-threaded output member threadedly engaged by a pair of nuts. One of the nuts is a first "brake-force-transmitting" nut clutchable to prevent rotation thereof and the other is a second "adjustment" nut clutchable to a land. Relative axial movement of these nuts relative to the output member is a measure of "excessive" brake clearance. Restoration of the normal spacing between these nuts restores brake clearance to "normal".

SUMMARY OF THE INVENTION

According to the present invention there is provided a slack adjuster having a non-rotatable fast-threaded output member threadedly engaged by a pair of nuts, one of the nuts being a first brake-force-transmitting nut clutchable to prevent rotation thereof and the other being a second adjustment nut clutchable to land, relative axial movement of these nuts relative to the output member being a measure of "excessive" brake clearance and restoration of the normal spacing between these nuts serving to restore brake clearance to "normal"; the nuts being housed in a housing which is non-rotatable but axially movable with respect to the output member, the first nut being clutchable to a thrust member resiliently loaded with a force which is overcome only by forces of the magnitude of braking forces transmitted through the slack adjuster, and there being a releasable coupling between the housing and the second nut which includes a splined connection and which is inoperative to prevent the second nut spinning on the output member except when he force transmitted by the slack adjuster is sufficient to overcome the resilient loading of the thrust member. This slack adjuster is a slack adjuster, having a pair of nuts threaded on its output member, which is of compact form.

For a better understanding of the invention and to show how the same may be carried into effect, reference will now be made, by way of example only, to the accompanying drawings in which.

DESCRIPTION OF THE PREFERRED EMBODIMENT

Figure 1:
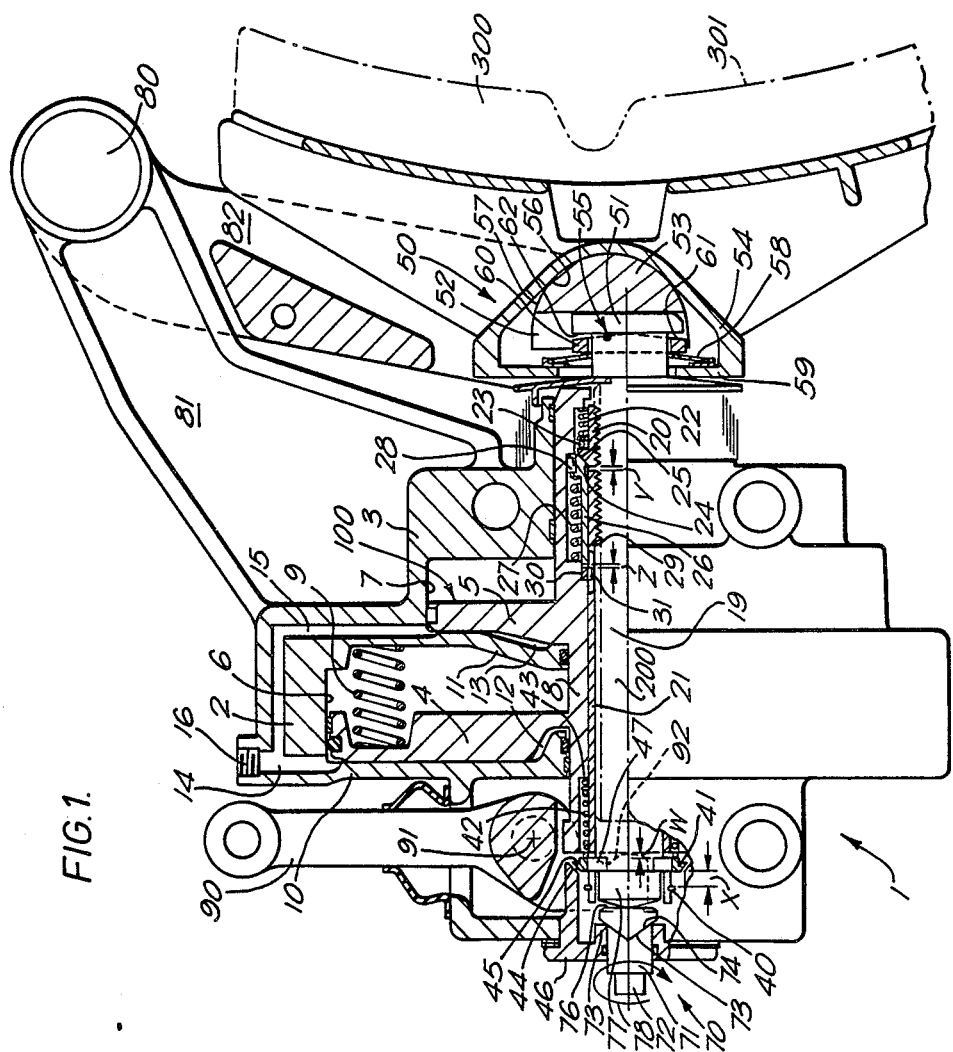
FIG. 1 is a diagrammatic cross-sectional view of a tread-brake unit that includes a slack adjuster, shown in its "released" condition.

Referring to the drawings, the tread-brake unit comprises, conventionally, an actuator 100, a slack adjuster 200 and a brake shoe 300 as a unitary construction.

The actuator 100 has a housing 1 that defines a pair of cylinders 2 and 3 in each of which is a piston respectively 4 and 5. One or other, or both of these pistons 4 and 5 is/are of non-circular peripheral configuration — specifically, square configuration and the internal wall 6 or 7 of the respective cylinder 2 or 3 is of complementary cross-sectional configuration to the peripheral configuration of the piston 4 or 5. The pistons 4 and 5 are interconnected by a common tubular piston rod 8 which is rotationally fast with both the pistons. Thus, by virtue of at least one of the pistons 4 and 5 being of non-circular peripheral configuration, whilst the pistons 4 and 5 are both slidable within their respective cylinders 2 and 3, the pistons 4 and 5 are non-rotatable in the cylinders 2 and 3 and, therefore, the tubular piston rod 8 is similarly slidable but non-rotatable with respect to the tread-brake unit as a whole.

The pistons 4 and 5 are resiliently urged to their lefthand positions as shown in FIG. 1 by a piston return spring 9.

The pistons 4 and 5 define, together with walls 10 and 11 which, as shown in FIG. 1, the pistons abut in their left-hand positions, chambers 12 and 13 which, via respective conduits 14 and 15, connect to an inlet port 16.

The actuator 100 also includes a non-rotational output member 19 which, in a manner to be described, is interconnected with and is for operation by the actuator 100 via the slack adjuster 200.

As thus far described, it will be seen that pressurisation of the chambers 12 and 13 via the inlet port 16 and the conduits 14 and 15 will move the pistons 4 and 5 to the right (as viewed in FIG. 1) against the action of the spring 9.

The slack adjuster 200 comprises a pair of nuts 20 and 21 of which the nut 20 is a force-transmitting nut and the nut 21 is an adjustment nut. Both of these nuts 20 and 21, which are fast-threaded, are threadedly engaged with the output member 19 of the actuator 100 and they are housed in the piston rod 8 which, for the nuts 20 and 21, constitutes a housing which is non-rotatable but axially movable with respect to the output member 19.

The force-transmitting nut 20 is resiliently loaded leftwards as viewed in the Figures by a spring 22 which loads the nut 20 via a thrust bearing 23. The nut 20 is urged by the spring 22 leftward so as to "make" a clutch provided by a clutch face 24 on the nut 20 and a clutch face 25 on a tubular thrust member 26 resiliently urged in a rightward direction as viewed in the Figures by a spring 27 to engage a spline 28 into an appropriately-shaped slot in the tubular piston rod 8. The spring 27, to achieve this, is of course stronger than the spring 22. The tubular thrust member 26 is splined at 29 to the output member 19. At the left-hand (as viewed in the Figures) end of the tubular thrust member 26 an abutment member in the form of a ring 30 is splined at 31 to the nut 21. In the condition of the tread-brake unit shown in FIG. 1, the ring 30 is spaced from the lefthand end of the tubular thrust member 26 by a distance "Z".

The adjustment nut 21 of the slack adjuster has, adjacent its leftward end as viewed in the Figures, a circlip 40 which is spaced a distance "X" from a clutch element 41. The clutch element 41 is resiliently loaded by a spring 42 rotatably supported by a thrust bearing 43 and having a clutch face 44 engageable (and, in fact, engaged as shown in FIG. 1) with a clutch face 45 on an end-plug of the unit constituting the other clutch element of the clutch 44/45. The clutch element 41 is also splined to the nut 21 at 47 with a clearance "W" between the splines and the nut 21.

The output member 19 is operatively connected at its right-hand (as viewed in the Figures) end to the brake shoe 300 by connection means 50 which will be described in more detail hereafter.

The tread-brake unit, as so far described, operates as follows:

BREAK "RELEASED" CONDITION

This is the condition of the unit in which it is shown in FIG. 1

MOVE TO "BRAKE ENGAGED" CONDITION

Upon pressurisation of the chambers 12 and 13 sufficient to overcome the piston return spring 9, the pistons 4 and 5 move to the right This movement (and the consequent rightward movement of the tubular piston rod 8) carries the nut 20 to the right by virtue of the spring 27 continuing to overcome the spring 22 (and, consequently, holding the clutch 24/25 "made") thus preventing the nut 20 from spinning along the output member 19. The nut 20 thus being unable to rotate, the output member 19 is also carried to the right by the nut 20, there being, at this stage, a relatively low resistance to the movement of the output member 19.

During this rightward movement the output member 19 also carries with it the nut 21 for, by virtue of the splined connection 47 of this nut 21 with the clutch element 41 and the clutch 44/45 being "made", the nut 21 cannot spin on the output member 19.

The pistons 4 and 5 cannot, of course, rotate to allow the whole structure to rotate and spin down the output member 19 by reason of one (or both) of the pistons 4 and 5 being of a non-circular peripheral configuration complemented by the internal wall 6 or 7 of the respective cylinder 2 or 3 and, therefore, non-rotatable in the cylinder Thus, in this stage of the operation, the pistons 4 and 5, the nuts 20 and 21 and the output member 19 all move axially together in a rightward direction. This movement continues until the circlip 40 engages the clutch element 41.

"NORMAL" CLEARANCE

If the clearance is "normal", the circlip 40 engages the clutch element 41 at the same instant that the brake shoe 300 engages the wheel tread.

"EXCESSIVE CLEARANCE"

If the clearance is "excessive", the circlip 40 engages the clutch element 41 before the brake shoe 300 engages the wheel, allowing further rightward movement of the output member 19 against continuing relatively low resistance. During this further movement, the clutch 24/25 continues to be "made" by the spring 27 thus allowing the pistons 4 and 5 via the tubular piston rod 8, spring 27, tubular member 26, clutch 24/25 and the nut 20 to continue the rightward movement of the output member 19. However, the circlip 40, now abutting the clutch element 41, causes the clutch 44/45 to disengage. The load in the spring 42 is then transmitted via the circlip 40 to the nut 21 which is now free to rotate. Further movement of the output member 19 to the right consequently causes nut 21, clutch ring 45 and spring 42 to rotate against the bearing 43. Consequently, the output member 19 is pulled through the nut 21 spinning it on its bearing 43.

Thus, whilst the nut 20 continues to move with the output member 19, the nut 21 remains in its usual position with its circlip 40 bearing against the clutch element 41. It will therefore be seen that a gap opens up between the adjacent ends of the nut 20 and 21.

"BRAKE ENGAGED" CONDITION

In this condition the brake shoe 300 has just engaged the wheel tread, the output member 19 has thus met a substantially increased resistance to further rightward movement and the nuts 20 and 21 are either abutting one another, if the clearance is "normal", or are spaced from one another by the amount by which the clearance is "excessive". This latter condition is that shown in FIG. 2 in which the degree of "excess" of clearance is the gap "V" between the two nuts 20 and 21.

BRAKE APPLICATION

Continued rightward movement of the output member 19 takes place with the member 19 now meeting substantially increased resistance as the brake shoe 200 has engaged the wheel tread. This increased resistance is transmitted to the nut 20. Further increase of pressure in the chambers 12 and 13 transmitted via the tubular piston rod 8 thus causes the spring 27 to collapse. This does not allow the clutch 24/25 to be "broken" for this clutch remains "made" under the action of the spring 22. However, the collapse of the spring 27 causes the abutment member that is the ring 30 to abut the tubular element 26 and become clamped between the tubular piston rod 8 and the tubular element 26. Such clamping of the ring 30 now prevents the nut 21 from any further rotation by virtue of the splined connection 31 of the ring 30 with the nut 21 and hence the ring 30 and the splined connection 31 constitute a releasable coupling between the piston rod 8 and the nut 21 which is inoperative to prevent the nut 21 spinning on the output member 19 except when the force transmitted by the slack adjuster is sufficient to overcome the spring 27.

Braking force generated by the pistons 4 and 5 is now transmitted via the tubular piston rod 8, ring 30, tubular member 26, clutch 24/25, nut 20, output member 19 and connection means 50 to the brake shoe 300. As the braking force thus generated rises, the system may "stretch". Should it do so, the output member 19 moves slightly further rightward as do all the other parts now secured thereto. These parts include the nuts 20 and 21 whose relative axial positions on the output member 19 are preserved with the engagement of the circlip 40 with the clutch element 41 causing the clutch faces 44 and 45 to be further separated.

RETURN TO "BRAKE RELEASED" CONDITION

As pressure is dropped in the chambers 12 and 13 to release the brakes, such "stretch" as may have occurred is first recovered. During this stage, the relatively high forces still in the unit hold the nuts 20 and 21 locked on the output member 19. Thus, the nuts 20 and 21 return leftward with the output member 19 whilst being maintained in their same relative positions on the member 19. However, once the "stretch" has been fully recovered, the spring 27 is freed to re-expand and release the ring 30 from being clamped between the tubular piston rod 8 and the tubular member 26.

If the slack clearance was previously "normal", the "stretch" is fully recovered (i.e. the brake shoe 300 is just about to leave the wheel tread) and the ring 30 is released at the same instant that the clutch 44/45 is "re-made" and the circlip 40 is just about to part from the clutch element 41. Thus, at the moment that the nut 21 is freed to spin by the unclamping of the ring 30, the nut 21 is re-clutched by the clutch 44/45. The nut 21 is, therefore, in this condition of "normal" clearance, held against rotation in the output member 19 at all times of the "release" movement Equally the nut 20 is at all these times held in axial position on the output member 19.

There therefore being no axial displacement of the nuts 20 and 21 relative to each other on the output member 19, there is no unwanted adjustment of slack clearance.

The two nuts 20 and 21 both still being prevented from rotation, they both continue to move bodily together on the output member 19 with the circlip 40 separating from the clutch element 41 until the distance "X" is restored and the pistons 4 and 5 are back in abutment with the walls 10 and 11 of the chambers 12 and 13. The tread brake unit is now back in its "released" condition.

If the slack has previously been "excessive", recovery of "stretch" proceeds as above described with the relative positions of the nuts 20 and 21 on the output member 19 being preserved. However, upon the full recovery of "stretch" and at the point at which the brake shoe is just about to leave the wheel tread, the nut 21 is prevented from any further leftward movement by the splined connection 47. The nut 21 is also prevented from rotating, as above described, by the clutch 44/45 having been "made". Thus, the output member 19 can no longer partake in any further leftward movement and it is held in this position (in which it is more extended than it previously was) by a distance equal to the amount by which the slack was "excessive" The slack is, therefore, restored to "normal".

However, the pistons 4 and 5 have not yet returned into abutment with the walls 10 and 11 and, as they continue their leftward movement under the influence of the spring 9, they carry with them (via the tubular piston rod 8) the tubular member 26. As this member 26 continues to return leftward the clutch 24/25 is eased and the nut 20 is allowed to "chase" the tubular member 26 under the influence of the spring 22, the nut 20 spinning on the output member 19 This continues until the pistons 4 and 5 are fully returned whereat the tread-brake unit is once again in its "released" condition with, as observed before, the slack set at "normal".

Turning now to the connection means 50, the output member 19 terminates in a cross-head 51 slidable in a vertical slot 52 in a thrust member 53. The termination of the output member 19 and the thrust member 53 are housed in a part 54 mounted on the brake shoe 300 for pivotal movement relative to both the output member 19 and the brake shoe 300 about an axis 55 extending transversely of both of these parts.

The part 54 has an internal concave face 56 centered in the axis 55 and the thrust member 53 has a complementary-shaped face 57 engaged with face 56.

The two faces 56 and 57 are forced into engagement one with the other by one or more dished spring(s) 58 operative between a back wall 59 of the part 54 and a thrust washer 60, the front face 61 of which is curved and bears against the rear face 62 of the cross-head 51.

This construction of the connection means 50 permits the brake shoe 300 to take up any pivoted position of the brake shoe 300 within its range of pivotal movement and, by virtue of the dished spring(s) 58 permits the brake shoe 300 to be held in any such position.

If the load of the vehicle is changed, this will result in consequential vertical displacement of the tread-brake unit relative to the axis of the wheel tread thereby bringing the top or bottom end (as the case may be) of the brake shoe 300 closer to the wheel tread than is the opposite end of the brake shoe 300. When the next brake application is made, the end of the brake shoe closer to the wheel tread first engages the tread and subsequent rightward movement of the output member 19 first pivots the brake shoe 300 about the axis 55 to engage the brake shoe along its whole length with the wheel tread against the resistance to movement offered by the dished spring(s) 58. When, after such a brake application has subsequently been released, the brake shoe 300 is moved bodily away from the wheel tread, it is held by the dished spring(s) 58 in a new pivoted position in which the brake shoe face 301 is now parallel to the wheel tread and, therefore, equidistantly spaced from it along the whole length of the brake shoe 300.

The above described tread-brake unit is provided with a "normal re-set" feature 70.

The re-set feature 70 includes a re-set member 71 rotatably mounted in the end-plug 46. At its outer end the member 71 has a square 72 engageable with a spanner. Along its length, the member 71 has a cam feature 73 engaged with a corresponding internal surface 74 at the inner end of a boss 75 of the end-plug 46. At its inner end face 76 the member 71 abuts a plunger 77.

To effect, manual re-setting (as is required, for example, on replacement of the friction material conventionally constituting the brake shoe 300), the member 71 is rotated as shown by arrow 78 in FIG. 1 with a spanner. This rotation, by virtue of the interengaged cam surfaces 73 and 74 drives the member 71 to the right (as viewed in the Figures) which, in turn, drives the plunger 77 to the right. It will be seen that the plunger 77 abuts the splines 47. Thus, movement of the plunger 77, firstly, disengages the clutch 44/45 and, thereafter, by engagement of the nut 21 with the nut 20, disengages the clutch 24/25. The clutches for both nuts 20 and 21 now being "broken" these nuts 20 and 21 are now freed for rotation. Under the influence of a brake release torsion spring (not shown) encircling a trunnion 80 and operative between two arms 81 and 82 of the tread-brake unit, the arm 82 is pivoted clockwise to push the output member 19 through the nuts 20 and 21. The brake shoe is thus moved clear of the wheel tread to allow replacement of the brake shoe.

To permit the fitting of the spring-applied brake actuator of co-pending patent application claiming priority from British Patent Application 8801790 (filed 27 Jan. 1988) as a "parking brake" facility, the tread-brake unit is further provided with a lever 90 pivotal about an axis 91. This lever 90 has an arm 92 (shown in dotted lines) engageable with the left-hand end face of the tubular piston rod 8. Thus, anti-clockwise pivoting of the lever 90 effects a brake application. The lever 90 is connectable to the output member of the spring-applied brake actuator of the co-pending application just mentioned and that actuator accepts the trunnion 80.

There has been described above the reset feature 70 which allows manual re-setting of the slack adjuster, for example on replacement of the friction material conventionally constituting the brake shoe. The re-set feature 70 described can however, under certain circumstances, fail to operate properly by virtue of the two nuts 20 and 21 jamming together under the load of the brake release torsion spring.

There has been described above the re-set feature 70 which allows manual re-setting of the slack adjuster, for example, on replacement of the friction material conventionally constituting the brake shoe. The re-set feature 70 described can, however, under certain circumstances, fail to operate properly by virtue of the two nuts 20 and 21 jamming together under the load of the brake release torsion spring.

Figure 3:
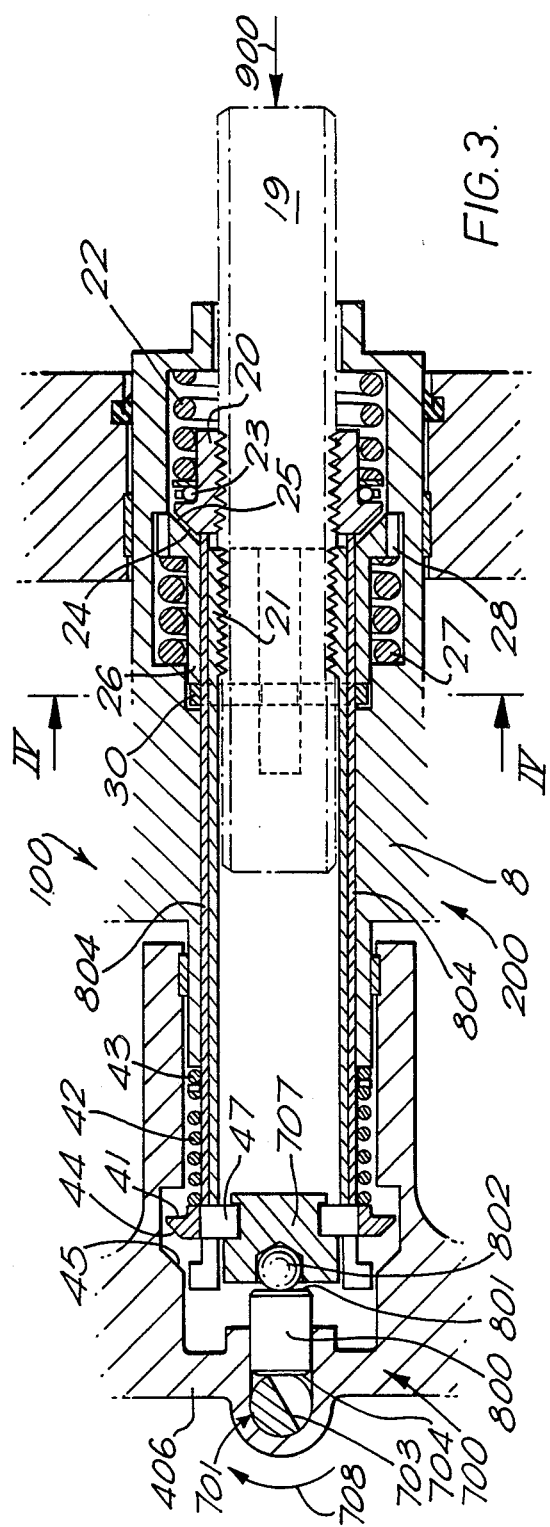
FIG. 3 is a cross-sectional view of a modified form of slack adjuster for the tread-brake unit.
Figure 4:
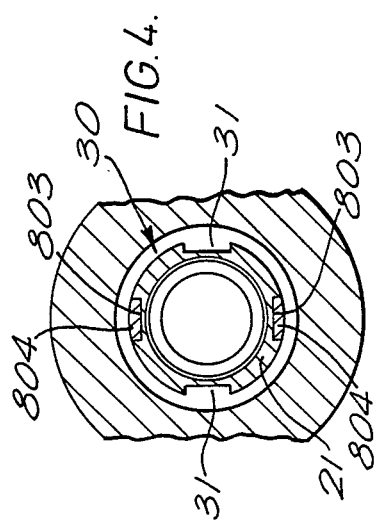
FIG. 4 is a cross-sectional view taken on line IV–IV in FIG. 3.

Referring to FIGS. 3 and 4, there will now be described a modified re-set feature 700.

In FIGS. 3 and 4 there is shown in detail only the slack adjuster 200 with fragmentary views only of the actuator 100.

As already described, the slack adjuster 200 has the pair of nuts 20 and 21 of which the nut 20 is the force-transmitting nut and the nut 21 is the adjustment nut. Both of these nuts 20 and 21 which are fast-threaded are threadedly engaged with the output member 19 of the actuator 100.

The force-transmitting nut 20 is resiliently loaded leftwards (as viewed in FIG. 3) by the spring 22 which loads the nut 20 via the thrust bearing 23. The nut 20 is urged by the spring 22 leftward so as to "make" the clutch provided by the clutch face 24 on the nut 20 and the clutch face 25 on the tubular thrust member 26 resiliently urged in a rightward (as viewed in FIG. 3) direction by the spring 27 to engage the spline 28 into an appropriately-shaped slot in the tubular piston rod 8, the spring 27 being stronger than the spring 22. At the left-hand (as viewed in FIG. 3) end of the tubular thrust member 26 is the ring 30 splined at 31 (FIG. 4) to the nut 21.

The adjustment nut 21 of the slack adjuster carries, adjacent its leftward end as viewed in FIG. 3, the clutch element 41. The clutch element 41 is resiliently loaded by the spring 42 rotatably supported by the thrust bearing 43 and having the clutch face 44 engageable with the clutch face 45 on an end 406 of the unit as a whole, which end corresponds with the end plug 46 described above. The clutch element 41 is also splined to the nut 21 at 47.

Figure 2:
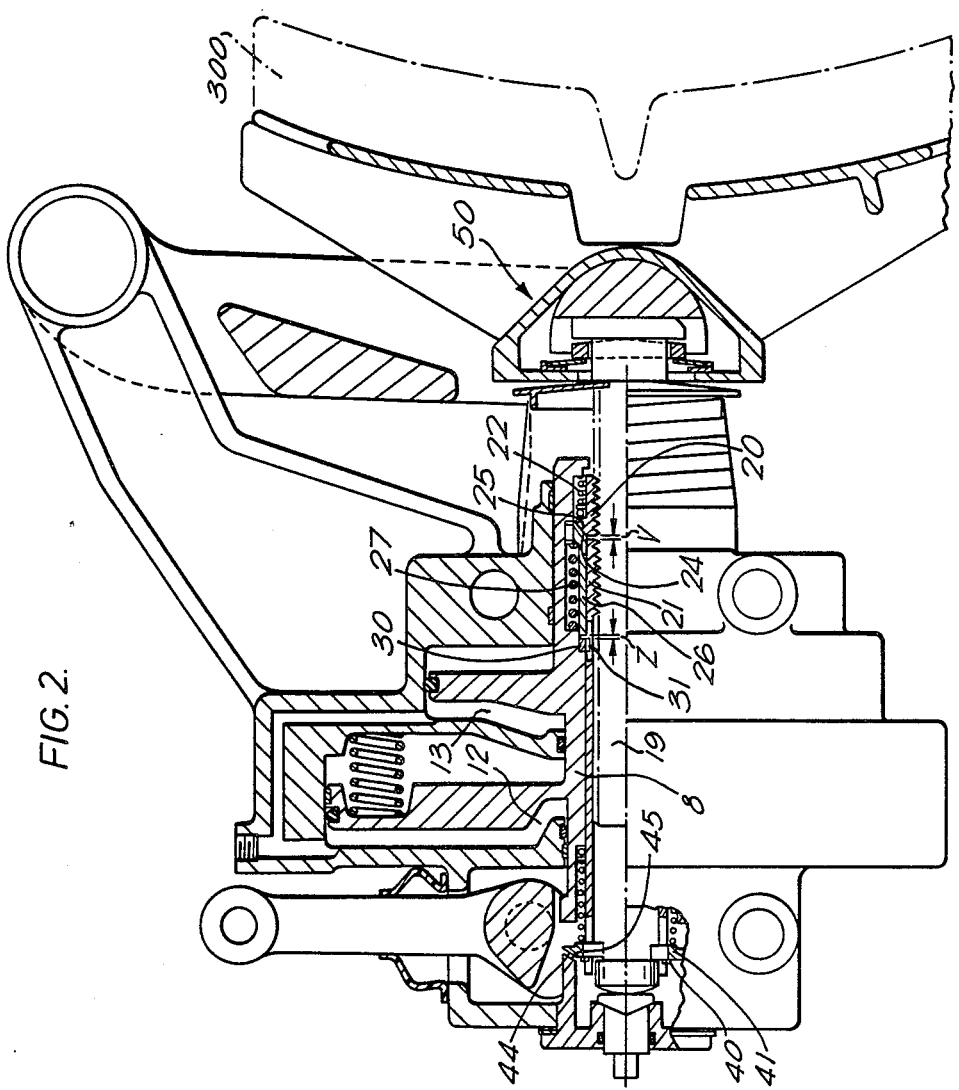
FIG. 2 is a similar view but with the unit shown in the "brake engaged" condition.

As thus far described, the slack adjuster of FIGS. 3 and 4 is, in all essentials, similar to the slack adjuster of FIGS. 1 and 2 and the operation of this slack adjuster to effect slack adjustment is the same as that of the slack adjuster of FIGS. 1 and 2.

As in the case of the slack adjuster of FIGS. 1 and 2, the slack adjuster of FIGS. 3 and 4 includes the re-set feature 700 for the same purpose and having the same general manner of operation as the re-set feature 70 already described.

The re-set feature 700 includes a member 701 mounted for rotation about an axis extending (out of the paper as viewed in FIG. 3) at right-angles to the longitudinal axis of the slack adjuster 200. At its outer end (not shown) the member 701 has a squared-end engageable with a spanner. Along its length the member 701 has a cam surface 703 engageable with the end face 704 of a piston 800 the other end 801 of which, through a ball-bearing 802, acts on a plunger 707.

The plunger 707 constitutes a drive member that acts, in turn, on extremities of the splines 47 of the clutch element 41 where they project through the spline-slots in the left-hand end (as viewed in FIG. 3) of the nut 21.

Passing along the length of the nut 21 are opposed longitudinal slots 803 (see FIG. 4) in which are respectively seated one of each of a pair of push-rods 804. The push-rods 804 are each slightly longer than the nut 21 so that they project beyond the ends thereof.

The position of the parts shown in FIG. 3 are those of the parts when manual re-setting is being effected.

Normally the member 701 will be rotated from its position shown in FIG. 3 in an anti-clockwise direction so that the flat cam surface 703 is abutted by the end 704 of the piston 800. In this condition the springs 22 and 42 move the nut 20 and the clutch element 41 back to the left as viewed in FIG. 3 to engage the respective clutches 23/24 and 44/45. In this condition the push-rods 804 project from the lefthand end of nut 21 and not from the right-hand end as they do in FIG. 3.

To effect manual re-setting (as is required, for example, on replacement of the friction material conventionally constituting the brake shoe), the member 701 is rotated as shown by arrow 708 with a spanner from the position above described to that shown in FIG. 3.

This rotation, by virtue of the inter-engaged cam surfaces 703 and 704 drives the piston 800 to the right (as viewed in FIG. 3) which, in turn, drives the plunger 707 to the right. By the abutment of the plunger 707 with the splines 47, such movement of the plunger 707 firstly disengages the clutch 44/45 releasing the nut 21 for rotation and, secondly, through the push-rods 804, disengages the clutch 24/25 to release the nut 20 for rotation.

With the two clutches 44/45 and 24/25 now broken (as in the condition shown in FIG. 3), and the nuts 20 and 21 freed to rotate, under the influence of the conventional brake-release spring (not shown) acting in the direction of arrow 900, the output member 19 is pushed towards the left (as viewed in FIG. 3) to move the brake shoe clear of the wheel tread. This clearance will allow replacement of the usual brake shoe.

By the provision of the push-rods 804, the two nuts 20 and 21 are prevented from jamming together to resist leftward movement of the output member 19.

While the present invention has been described in connection with the preferred embodiments of the various Figures, it is to be understood that other similar embodiments may be used or modifications and additions may be made to the described embodiments for performing the same function of the present invention without deviating therefrom. Therefore, the present invention should not be limited to any single embodiment but rather construed in breadth and scope in accordance with the recitation of the appended claims.

We claim:

1. A slack adjuster having a non-rotatable fast-threaded output member threadedly engaged by a pair of nuts, one of the nuts being a first brake-force-transmitting nut clutchable to prevent rotation thereof and the other being a second adjustment nut clutchable to land, relative axial movement of these nuts relative to the output member being a measure of "excessive" brake clearance and restoration of the normal spacing between these nuts serving to restore brake clearance to "normal"; the nuts being housed in a housing which is non-rotatable but axially movable with respect to the output member, the first nut being clutchable to a thrust member resiliently loaded with a force which is overcome only by forces of the magnitude of braking forces transmitted through the slack adjuster, and there being a releasable coupling between the housing and the second nut which includes a splined connection and which is inoperative to prevent the second nut spinning on the output member except when the force transmitted by the slack adjuster is sufficient to overcome the resilient loading of the thrust member.

2. A slack adjuster as claimed in claim 1, wherein said releasable coupling comprises an abutment member in splined engagement with the second nut, there being a clearance between this abutment member and the thrust member in a "brake released" condition of the slack adjuster; the abutment member being moved into abutment with the thrust member when said sufficient force is transmitted by the slack adjuster thereby to secure the second nut to the housing.

3. A slack adjuster as claimed in claim 1, wherein the first nut is clutchable to the thrust member through a spring-biased-to-engage clutch, and wherein the thrust member is spring biased into splined engagement with the housing.

4. A slack adjuster as claimed in claim 3, wherein the second nut is clutchable to said land through a spring-biased-to-engage clutch of which said land constitutes one clutch element of this clutch, the other clutch element of which is in splined engagement with the second nut.

5. A slack adjuster as claimed in claim 4, wherein there is rotatably mounted in said other clutch element a re-set member that can be manually rotated such that a cam surface thereof in co-operation with a corresponding cam surface of the other clutch element drives the re-set member to disengage both the clutch associated with the second nut and the clutch associated with the first nut whereby movement of the output member for effecting brake shoe replacement is permitted.

6. A slack adjuster as claimed in claim 5, wherein the re-set member when driven first moves the second nut to disengage the clutch associated therewith, and then, via further movement of the second nut, moves the first nut to disengage the clutch associated with the first nut.

7. A slack adjuster as claimed in claim 4, wherein there is rotatably mounted in said other clutch element a re-set member that can be manually rotated such that a cam surface thereof drives a drive member to move the second nut to disengage the clutch associated therewith, and to move, via a push rod arrangement extending past the second nut, the first nut to disengage the clutch associated with the first nut.

* * * * *